Patented June 28, 1938

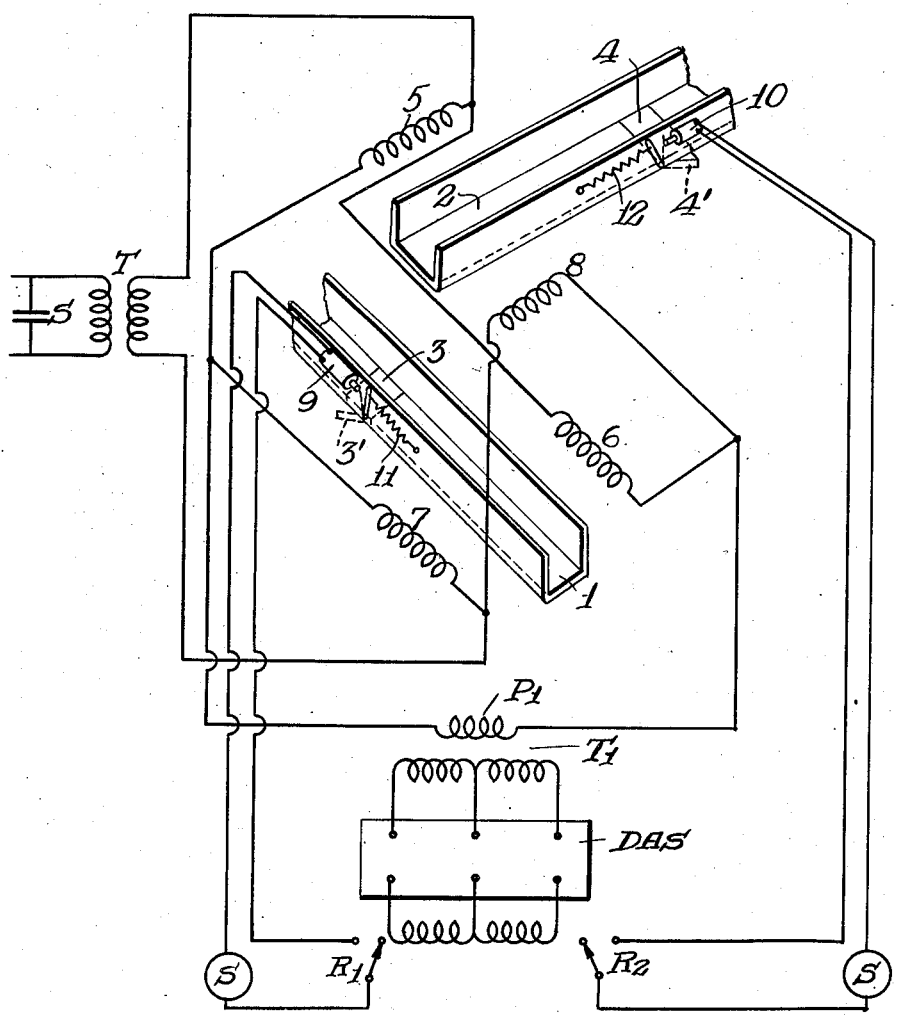

2,121,787

UNITED STATES PATENT OFFICE 2,121,787

METHOD AND APPARATUS FOR DETERMINING THE MIGRATION OF FISH

Edwin H. Dahlgren, Seattle, Wash., assignor to Government of the United States, as represented by the Secretary of Commerce Application November 23, 1936, Serial No. 112,208

4 Claims. (Cl. 175—265)

(Granted under the act of March 3, 1883, as amended April 30, 1928; 370 O. G. 757)

The invention described herein may be manufactured and used by or for the Government of the United States for governmental purposes without the payment to me of any royalty thereon.

My invention relates specifically to a method and apparatus for determining the migration of fish, but is applicable generally to the detection of the presence of any of the ferro metals.

As previously practiced by the Bureau of Fisheries of the United States Department of Commerce, migrating fish having been identified by tags attached by clips to the tails, these tags being recovered from the fish meal after the fish are processed at the packing plants. The attaching of the tags to the tails causes flesh injury and unnecessary destruction of fish through infection, as well as loss of identification tags due to the fact that the tags tear out of the flesh.

In my method and apparatus I insert into the body cavities of the fish small ferro metal tags bearing identifying serial numbers, the tags lying between the body wall and the visceral organs, and on the recapture of the fish on the fishing grounds electrically identify the fish by the presence of the tags, recovering them before they are processed.

In carrying out this method I have provided an apparatus, an example of which I have illustrated in the accompanying drawing wherein numerals 1 and 2 designate conveyor chutes or sluiceways through which the fish are passed. The conveyors are provided with ejector gates 3 and 4 which are operated by an electrical system, such, for example, as an impedance bridge preferably comprising coils 5, 6, 7 and 8, pairs of which, 5 and 8, 7 and 6, are located opposite the sluiceways so that the fish bearing the identification tags may change the impedance of the system, thus operating the ejector gates 3 and 4.

As illustrated, the input system for the impedance bridge comprises a transformer T coupled to a source of alternating current S, which applies potential to the common terminals of coils 5, 6 and 7, 8, respectively. The output of the bridge coupled to the common connection between the coils 5, 7 and 6, 8, respectively, includes the primary $P^1$ of the transformer $T^1$. The secondary of the transformer $T^1$ is a compound secondary $S^1$, coupled in this instance to a differential, amplifier and selector DAS, the output of which operates relays $R^1$ and $R^2$ mechanically or electrically connected to the ejector gates 3 and 4 in the conveyors or sluiceways 1 and 2.

In the drawing I have illustrated the relays $R^1$ and $R^2$ connected through sources of current S to electromagnets 9 and 10 operating spring controlled armatures 11 and 12 mechanically attached to the ejector gates 3 and 4 so that when either of the relays 1 and 2 is operated by the differential, amplifier and selector system DAS, the ejector gates 3 and 4 move to the position shown in dotted lines and designated 3', 4'. It is to be understood, however, that other means than those illustrated may be used to mechanically or electrically operate the ejector gates 3 and 4.

The operation of my system and method is as follows:

The bridge system comprising coils 5, 8, 7, 6 is so balanced that no current flows in the primary $P^1$ of the transformer $T^1$. When a number of fish, including one or more, bearing identification tags passes through the conveyors or sluiceways 1 and 2, the impedance of the bridge is unbalanced so that if the fish passes between the coils 6 and 7, relay $R^1$ is operated to open the ejector gate 3. If the fish carrying the metal identification tag passes through the conveyor or sluiceway 2, the bridge is unbalanced so that the relay $R^2$ is operated, opening ejector gate 4. A number of different types of apparatus differing in details of construction are known to me which will selectively identify the fish bearing the identification tags.

It is to be understood that many of these different detail forms of apparatus may be employed in connection with my invention without departing from the scope of the claims appended hereto which are as follows:

I claim:

1. In an apparatus for identifying fish bearing metal identification tags, the combination of a conveyor having an ejector gate, a balanced electrical circuit positioned adjacent said conveyor whereby the presence of said fish bearing the metal identification tags unbalances said electrical circuit, and means coupling the output of said balanced electrical circuit for operating said ejector gate.

2. The step in the method of determining the migration of fish which consists in identifying certain fish by inserting metallic identification pieces within the body cavities lying between the body walls and the visceral organs of the fish.

3. The steps in the method of determining the migration of fish which consists in identifying certain fish by inserting metallic identification pieces within the body cavities of the fish and on recapture electrically segregating the fish bearing the metal identification pieces.

4. The steps in the method of determining the migration of fish which consists in identifying certain fish by inserting metallic identification pieces within the body cavities lying between the body wall and the visceral organs of the fish and on recapture electrically segregating the fish bearing the metal identification pieces by passing the same through a balanced electrical system whereby the presence of the fish bearing the identification pieces unbalances said electrical system.

EDWIN H. DAHLGREN.